Patented Sept. 10, 1940

2,214,562

UNITED STATES PATENT OFFICE 2,214,562

METHOD OF TREATING POULTRY AND OTHER EDIBLES

Maurice B. McCadam, Ogdensburg, N. Y., and Milton G. Dimon, Wellesley, Mass., assignors to E. I. du Pont de Nemours & Company, Wilmington, Del., a corporation of Delaware No Drawing. Application August 15, 1939, Serial No. 290,196

11 Claims. (Cl. 99—107)

Our invention relates to a method of treating edible meats and fish, particularly poultry and the like, whether eviscerated or not, to facilitate the removal of the feathers in the case of poultry, to reduce evaporation of natural fluids when in storage, to preserve the edible from deterioration, oxidation, discoloration, hardening, dehydration and weight loss, to inhibit the growth of bacteria and to prevent ruptures of the cells of the skin when chilled.

The common commercial method of treating poultry to prepare it for the market consists of a number of steps as follows: The bird is plunged for about 28 to 30 seconds in hot water at 128° to 138° F. Then the large feathers are removed generally by hand. But in a large percentage of cases there is left in the skin a number of quills and pins. The bird is then dried in a current of warm air, as in an air tunnel. The common practice is then to dip the bird into a bath of melted wax and after the wax has cooled, it is peeled off, carrying with it the quills, pins and hair which are embedded in the wax. Thereafter the bird is held for market under proper cooling. At present the cooling temperature and the conditions of humidity must be carefully adjusted in order to mitigate as much as possible the decomposition, the physical and chemical changes and the loss of the fresh appearance or "bloom" which result from storage. The control of the cooling process is expensive and generally unreliable.

According to our invention, we dip the bird, which is preferably fresh killed, into a water bath containing as a solution or dispersion a surface-active agent such as the soap substitutes of commerce. We employ an organic surface-active agent which is non-hygroscopic and which possesses a high penetrating power, i. e. one capable of penetrating very small orifices such as skin pores. We prefer the use of non-toxic substances since by using them we can avoid the necessity of special precautions to remove all traces of the surface-active agent before the product reaches the consumer's table. We prefer to use a sodium salt of the half sulfuric ester of a normal primary alcohol containing 8 to 18 carbon atoms per molecule. We find that satisfactory results are obtained in the practice of our invention by the use of one-quarter ounce of sodium lauryl sulfate per gallon of water, although this amount may be varied within wide limits. The temperature of the bath is preferably adjusted at some point between 100 and 175 degrees F. and the immersion may be anything from a few seconds to a few minutes, varying inversely with the temperature. Our process can be performed at temperatures below 100 degrees F. provided that the immersion is made sufficiently long, and, likewise, if the immersion is very short (to mitigate the danger of scalding) the process can be carried out at temperatures above 175 degrees F. For the solution described above we prefer a temperature of approximately 130 degrees F. and an immersion time of approximately 35 seconds in the case of a normal fowl. In the case of a bird already defeathered, we find that satisfactory results are obtained with a bath containing one-quarter ounce of sodium lauryl sulfate per gallon of water at a preferred temperature of approximately 110 degrees F. in which the bird is immersed for about one minute. The bird may then be stored in the customary manner.

We have found that a surface-active agent of this sort (the variants of which are specified hereinafter) penetrates into the small cavities, such as the pores and feather sockets or follicles, in the skin of the bird and causes an emulsification of the adherent substances, such as fats and oils. The agent also emulsifies the greases on the skin and thereby loosens the adhering dirt and extraneous substances and serves to detach these substances from the skin.

We have found that the contact of the solution containing the surface-active agent with the bird or other edible being treated modifies the surface properties of the treated bird so as to increase greatly the resistance of the bird to oxidation, discoloration and deterioration of every kind. We have not determined the exact nature of the surface action that takes place; it may be a local chemical reaction, or the adsorption of a monomolecular layer of the surface-active agent, or perhaps the formation upon drying of a tangible film of the surface-active agent. Our observation of the qualities of treated and untreated birds and of the remarkable results of the treatment leads us to believe that when the bird is removed from the bath the surface-active agent, having penetrated into the cavities and pores in the skin and covered the entire surface, forms a very thin quick-drying film which is elastic, pliable, dry, non-hygroscopic, non-tacky, and will not rub off in ordinary handling. This film is likewise tasteless, odorless and non-toxic.

We have found that, when the solution of surface-active agent penetrates the small cavities in the skin of the bird, the agent is adsorbed on the surface of the skin so that the solution readily drains out of the cavities when the bird is removed from the bath. What solution remains is spread out thinly. The water is therefore effectively evaporated on drying so that there is no moisture or very little in these cavities. Thus the skin is freed of moisture except for possible minute quantities in the cavities. If any solution remains in the skin cavities, it is so small in amount and of such character that when the bird is chilled to any freezing temperature in the range commercially used for storage, including the dangerous "crystallization zone" (21°–31° F.) now avoided by the industry, only very minute or microscopic ice crystals are formed which are not large enough to rupture or discolor the cells of the skin.

By our treatment the bird is protected, to a degree hitherto unattained, from deterioration by bacterial action and decomposition. The character of its surface resists the attacks of bacteria. Also the treated skin contains no free moisture that form ice crystals large enough to cause ruptures therein which, if they existed, would permit the entrance of bacteria.

This treatment preserves the freshness of the bird under holding temperatures, that is, temperatures near the freezing point at which the bird is held for the market. This freshness, which is indicated by the appearance and bloom characteristic of a fresh killed bird, is retained under cold storage conditions which would cause discoloration and deterioration in birds not so treated. This treatment also prevents substantial loss of moisture upon thawing. Our invention enables longer preservation of the bird in cold storage in a wholesome state and allows greater variations in the conditions of storage, such as temperature and humidity.

The present practice relating to the cold storage of meats and poultry is to make no attempt to remove surface moisture and sometimes even to take measures to retain free moisture on the surface. Our novel process, however, employs a surface-active agent that is non-hygroscopic and achieves better keeping qualities by the elimination of free surface moisture.

Although the economy and efficiency in defeathering achieved by our invention adapts it particularly for the treatment of poultry, the other advantages of our treatment, which we have described above, may be realized in the treatment of other edibles, such as meats, sausages and fish as well as poultry.

We have found that our treatment of edible meats and fish makes possible a further advantageous treatment which will "tenderize" the bulk of an article of food which contains moisture without affecting the surface. This further treatment is performed after the edible has been treated by immersing it in an aqueous bath containing a surface active agent as described herein. The surface treated article, freed of surface moisture, is placed in a refrigerator and subjected to a number of temperature cycles, the temperature alternately sinking to about 20° F. and rising to about 40° F. and passing slowly through the "crystallization zone" (30°–21° F.) during cooling. The precise temperature limits of these cycles may be varied in accordance with the degree of completeness of freezing and thawing most suited to "tenderizing" the particular type of meat treated. The temperature cycles cause repeated formation of ice crystals in the interior of the edible. The crystals tend to break down the cell walls thus making the edible more tender. But because of our treatment of the surface, the surface or skin is not damaged or discolored or rendered susceptible to the attack of bacteria in the refrigerating process, while the interior of the edible is "tenderized" in its own natural fluids.

Surface-active agents, or mixtures thereof, which are herein understood to be organic compounds of high molecular weight having good wetting and high penetrating properties, are suitable for use. Those surface-active agents are preferred which leave the surface of the poultry, meat, etc., in a dry, elastic, non-tacky, non-toxic and non-hygroscopic condition. The salts of the sulfation products of saturated and/or unsaturated primary alcohols containing 8 to 18 carbon atoms are particularly well fitted for our treatment. These sulfation products may be and commonly are simple half sulfuric esters of the corresponding alcohols, and their salts have the structure of a double salt which is half ester and half salt. In the case of unsaturated alcohols, however, one of the sulfation products may be a compound containing two acid sulfate (half ester) groups. These products correspond to the double half-ester of a dihydroxy alcohol and their salts are surface-active agents of high penetrating power suitable for our invention. Salts of sulfated secondary alcohols containing 8 or more carbon atoms in the alkyl chain, including those secondary alcohol sulfates prepared by the oxidation of petroleum hydrocarbons, are also suited for our invention. Representative of this group of substances is 2-8-diethyl-tridecanol-6-sodium sulfate. Salts of sulfonated alcohols as distinguished from the above described salts of sulfated alcohols are also surface-active agents suitable for our process. They are as a general rule somewhat less to be preferred for the purposes of the present invention.

Another class of surface-active agents well suited for my invention comprises the salts of sulfated or sulfonated esters, including those produced by the sulfonation of animal and vegetable oils and also esters of sulfated or sulfonated dicarboxylic acid. Representative of this latter group of substances are the sodium salt of the ethyl-hexyl ester of sulfosuccinic acid and the sodium salt of the di-octyl ester of sulfosuccinic acid. Representative of the broader class are the salts of the sulfoacetates of saturated and unsaturated primary alcohols.

Still another class of substances possessing the surface-active qualities desired for the purpose of our process are the salts of sulfated or sulfonated ethers containing at least 8 carbon atoms per molecule, including the sodium salts of sulfated or sulfonated ethers of polyhydric aliphatic alcohols, such as sulfated or sulfonated glycol or glycerol ethers.

Examples of specific substances suitable for our invention are: sodium lauryl sulfate, sodium octyl sulfate, sodium myristyl sulfate, sodium cetyl sulfate, sodium stearyl sulfate, sodium oleyl sulfate, the sodium salt of the acid sulfuric ester of 1,9-octodecanediol, 2-8-diethyl-tridecanol-6-sodium sulfate and the sodium salt of the di-octyl ester of sulfosuccinic acid.

Although we have named above certain types of surface-active agents which are preferable for the practice of our invention, we do not intend to limit our invention to the use of those agents. We consider the use, for the purposes set forth above, of the following surface-active agents, as well as those already named, to be within the scope of our invention:

(1) Salts of alkylated aromatic sulfonic acids containing at least 8 carbon atoms per molecule, including compounds containing a hydroxyl group such as derivatives of phenol and naphthol. Representative of this class of substances are sodium salts of isopropyl and isobutyl naphthalene sulfonic acids.

(2) Quaternary ammonium and phosphonium and ternary oxonium and sulfonium compounds having respectively at least one alkyl group which contains at least 8 carbon atoms.

(3) Salts of partial phosphate or phosphite esters of normal primary or secondary alcohols, including those alcohols produced by the oxidation of petroleum hydrocarbons.

(4) Mahogany sulfonates which may be prepared by the treatment of petroleum hydrocarbons containing an appreciable percentage of olefinic constituents with sulfuric acid or its equivalents.

(5) Salts of products produced by the treatment of petroleum hydrocarbons with sulfur dioxide and chlorine. Representative of this class of products are those described in U. S. Reissue Patent No. 20,968, issued January 3, 1939.

(6) Oleyl para-anisidine sodium sulfonate.

(7) Salts of sulfonated imid azolines.

(8) Salts of sulfated or sulfonated substituted amides containing at least 8 carbon atoms per molecule.

Solutions of common soap do not possess sufficient penetrating power to yield satisfactory results in our process. In the appended claims we use the word "non-carboxylic" to distinguish the surface active agents which we use from the simple inorganic salts of carboxylic acids, in which class falls common soap. By this term we do not mean to exclude from the claims surface active agents in which the carboxyl group appears in the form of an ester instead of as a salt or acid, for instance, surface active agents of the above mentioned class of sulfonated esters.

It is to be understood that the value of these compounds will vary, depending upon the particular objectives of the treatment. For example, if it is merely desired to facilitate plucking of the poultry or other edible birds, surface-active agents may be used which, while they possess the property of loosening the feathers do not possess those other valuable properties which were previously referred to, or possess them in a lesser degree than the preferred agents. Where these agents are used only for their ability to facilitate plucking it is contemplated that the bird may be washed free of the agent after it has been plucked. In the same manner, where the primary purpose of the surface-active agent is to improve the appearance or other characteristics of the bird during storage an agent may be selected which possesses outstanding properties in this respect, although it may not be as advantageous in the plucking operation as some of the preferred agents. Where both facility in plucking and preservation upon storage is desired it is contemplated that a mixture of surface-active agents may be used in order that each of the desired objectives will be attained to a greater degree than by the use of one agent alone.

Among the advantages of our process are the following: In a majority of cases no further treatment of the bird is necessary to prepare it for the complete removal of the feathers. The usual waxing is thus rendered generally unnecessary but may be used if desired. Our treatment will also impart valuable storage properties when applied to birds after their feathers have been removed by prior art processes. Our process effectively removes extraneous substances. It reduces to a minimum the deposit of free moisture and the formation of ice crystals in or on the skin while the bird is in cold storage. It prevents damage by bacteria and preserves the freshness, bloom and color of the bird without dehydration or discoloration during initial cooling or subsequent freezing. It prevents loss of weight by evaporation or sweating and insures the permanence of character and appearance that is unchanged by prolonged refrigeration or by alternating exposures to heat and cold. It provides against oxidation, dehydration and loss of weight and minimizes the occurrence of freezer burns, box burns and the like.

It is to be understood that the scope of this invention includes all modifications as to procedure and all equivalent materials coming within the terms of the claims and is not limited to any specific embodiments of the invention hereinbefore disclosed.

We claim:

1. The method of treating non-living poultry, meats and fish in order to prevent deterioration thereof which comprises wetting said articles of food with a liquid containing a non-carboxylic surface-active agent having at least 8 carbon atoms in the molecule.

2. The method of storing and preserving non-living poultry, meats and fish which consists of increasing the resistance of said articles of food to bacteria and reducing the amount of free moisture on the surface of said edibles, by wetting said edibles with a liquid containing a non-carboxylic surface-active agent having at least 8 carbon atoms in the molecule, followed by drying.

3. The method of treating fresh killed poultry which consists of emulsifying the adherent substances which envelop the ends of the feathers in the skin of the bird thereby loosening the feathers to facilitate plucking, and coating the skin and the cavities therein with a thin, non-toxic, non-tacky, non-hygroscopic film resistant to bacteria, thereby improving the keeping qualities of the bird, by dipping the bird in an aqueous bath containing a small percentage of a surface-active agent comprising a salt of a sulfation product of an alcohol containing at least 8 carbon atoms per molecule.

4. The method of treating fresh killed poultry which consists of adsorbing a surface active agent on the surface of the skin or outer layer, so that water readily drains off and does not remain in large enough aggregation to form ice crystals capable of piercing the skin or outer layer, and forming a thin, non-toxic, non-tacky, non-hygroscopic film on the surface of the skin or outer layer and the cavities thereof, thereby improving the keeping qualities of the said edibles, by dipping the poultry in an aqueous bath containing a small percentage of a surface-active agent comprising a salt of a sulfation product of an alcohol containing from 8 to 18 carbon atoms per molecule.

5. The method of treating fresh-killed poultry which consists of emulsifying the adherent substances which envelop the ends of the feathers in the skin of the bird thereby loosening the feathers to facilitate plucking and increasing the resistance of the skin of the bird to oxidation and to the activities of bacteria thereby improving the keeping qualities of the bird, by dipping the bird in an aqueous solution of a surface-active agent comprising a salt of the sulfation product of an alcohol containing from 8 to 18 carbon atoms per molecule.

6. The method of treating non-living fresh poultry, meats and fish which consists in adsorbing a surface-active agent on the surface of the skin or outer layer, thereby enabling the poultry, meat or fish to be more readily drained and dried of surface moisture and increasing the resistance of the surface to oxidation and to the attack of bacteria and other deterioration, by dipping the poultry or other edibles in an aqueous solution of a surface-active agent comprising sodium lauryl sulfate.

7. The method of treating fresh-killed poultry which consists of emulsifying the adherent substances which envelop the ends of the features in the skin of the bird, thereby loosening the feathers to facilitate plucking and increasing the resistance of the outer parts of the bird to oxidation, deterioration, and to the activities of bacteria, thereby improving the keeping qualities of the bird, by dipping the bird in an aqueous solution of a surface-active agent comprising sodium lauryl sulfate.

8. The method of treating fresh-killed poultry which consists of emulsifying the adherent substances which envelop the ends of the feathers in the skin of the bird, thereby loosening the feathers to facilitate plucking and increasing the resistance of the outer parts of the bird to oxidation and to the activities of bacteria and other deterioration, by dipping the bird in an aqueous solution of a surface-active agent comprising a salt of a sulfated or sulfonated ether containing at least 8 carbon atoms per molecule.

9. The method of treating fresh killed poultry which consists of adsorbing a surface-active agent on the surface of the skin or outer layer, thereby enabling the poultry to be more readily drained and dried of surface moisture and increasing the resistance of the surface to oxidation, and to the attack of bacteria and other deterioration, by dipping the poultry or other edibles in an aqueous solution of a surface active agent comprising a salt of a sulfated or sulfonated ester containing at least 8 carbon atoms per molecule.

10. The method of treating fresh killed poultry which consists of adsorbing a surface-active agent on the surface of the skin or outer layer, thereby enabling the poultry to be more readily drained and dried of surface moisture, and increasing the resistance of the surface to oxidation and to the attack of bacteria and other deterioration, by dipping the poultry in an aqueous solution of a surface-active agent comprising a salt of a sulfated or sulfonated ether or ether-alcohol containing at least 8 carbon atoms per molecule.

11. The method of treating fresh-killed poultry which consists of emulsifying the adherent substances which envelop the ends of the feathers in the skin of the bird, thereby loosening the feathers to facilitate plucking and increasing the resistance of the outer parts of the bird to oxidation, and to the activities of bacteria and other deterioration, by dipping the bird in an aqueous solution of a surface-active agent comprising a salt of a sulfated or sulfonated ester containing at least 8 carbon atoms per molecule.

MAURICE B. McCADAM.
MILTON G. DIMON.